Figure 1:
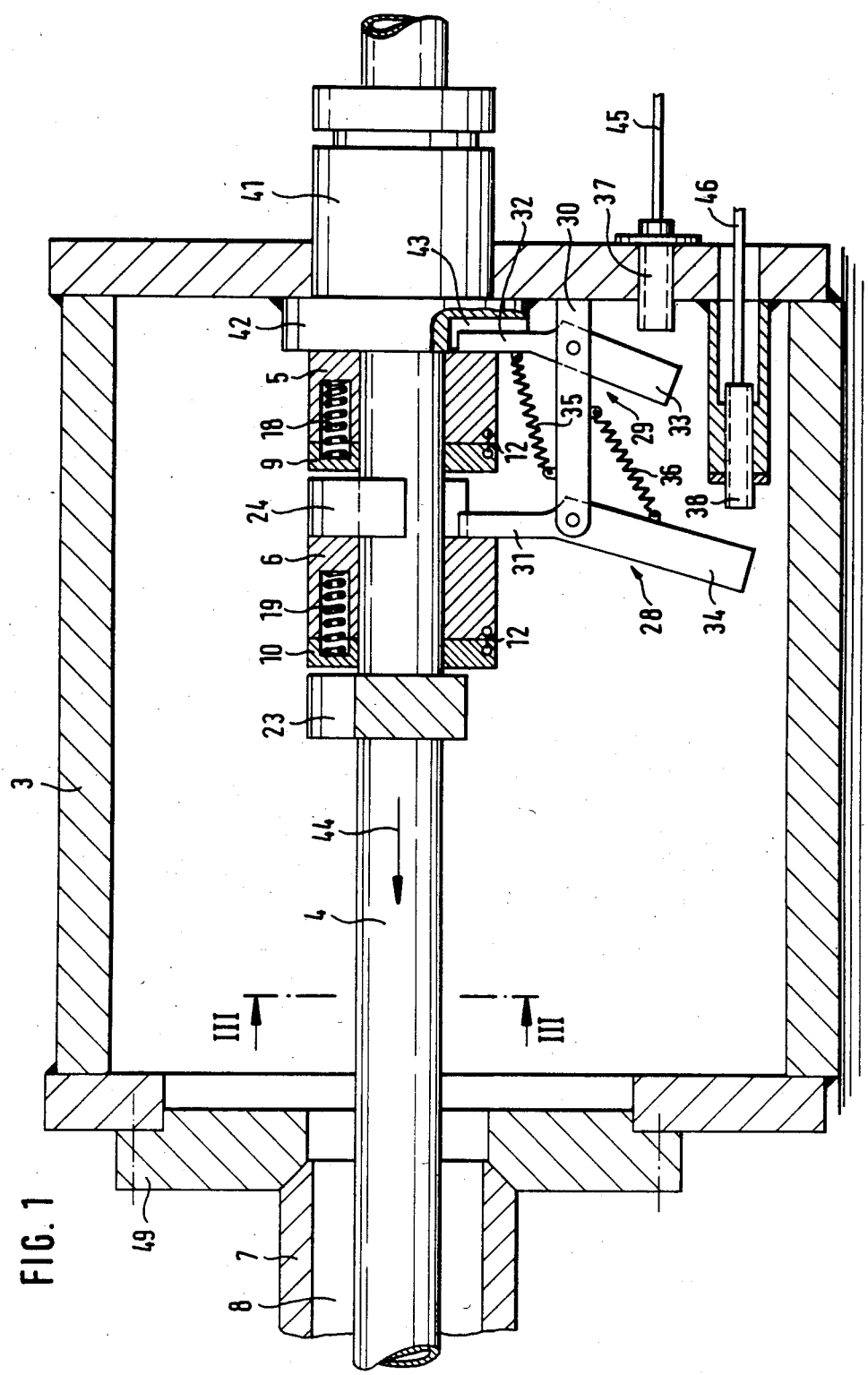

United States Patent [19]

Gottschalk et al.

[11] Patent Number: 4,568,226
[45] Date of Patent: Feb. 4, 1986

[54] DEEP-HOLE DRILLING MACHINE

[75] Inventors: William P. Gottschalk, Mt. Clemens; Bramwell W. Bone, Madison Heights, both of Mich.

[73] Assignee: Wilhelm Hegenscheidt Gesellschaft mbH, Erkelenz, Fed. Rep. of Germany

[21] Appl. No.: 529,601

[22] Filed: Sep. 6, 1983

[30] Foreign Application Priority Data

Mar. 7, 1983 [DE] Fed. Rep. of Germany ....... 3308029

[51] Int. Cl.⁴ ............................................. B23B 45/14
[52] U.S. Cl. .................................... 408/56; 408/72 R; 408/705; 409/135
[58] Field of Search ................... 408/56, 136, 83, 705, 408/113; 279/29, 20; 409/135, 136

[56] References Cited

U.S. PATENT DOCUMENTS

| | | | |
|---|---|---|---|
| 2,189,604 | 2/1940 | Healy | 408/83 |
| 2,795,977 | 6/1957 | Carlstedt | 408/705 X |
| 4,053,249 | 10/1977 | Ness et al. | 408/83 X |
| 4,377,023 | 3/1983 | Boesch | 408/56 X |

Primary Examiner—Z. R. Bilinsky
Attorney, Agent, or Firm—Arthur B. Colvin

[57] ABSTRACT

In known deep-hole drilling machines, the undesirable situation arises, in the case of large drilling depths, that the boring bar, which becomes increasingly softer with increasing drilling depth, sags and starts to vibrate, so that the boring bar must be supported. This should, however, be possible at suitable spacings in the simplest possible manner and without interrupting the working process. For this purpose, it is envisaged that at least one guide bush for supporting the boring bar in a workpiece bore is provided on the boring bar, the guide bush being associated in a coaxial arrangement with a clamping ring of a ringe thickness which makes self-jamming tilting on the boring bar possible, and which clamping ring is pivotally coupled at one peripheral point to the guide bush to permit a small radial movement and has an external diameter smaller than that of the guide bush, and that at least one disengageable stopping device for a guide bush is provided within the coolant feed device.

11 Claims, 6 Drawing Figures

DEEP-HOLE DRILLING MACHINE

The invention relates to a deep-hole drilling machine, having a coolant feed device which is arranged on a machine foundation and through which a boring bar passes.

Deep-hole drilling machines of the type described above are generally known and have proved outstandingly suitable in practice. In the case of relatively large drilling depths, however, the boring bar becomes too soft and sags. On the one hand, this can cause damage to the workpiece and, on the other hand, the boring bar can start to vibrate so that, due to the vibrations of the boring bar, the machining cannot be continued or the machining result becomes unsatisfactory. It would be possible to solve these problems, if the boring bar could be supported, depending on its length, at certain point which are suitable for this purpose by reason of the vibrations, and if the support of the boring bar at this point could be maintained.

It is thus the object of the invention to propose a deep-hole drilling machine of the type described above, which makes it possible to support the boring bar in a simple manner at least at one suitable point within the workpiece, without it being necessary to interrupt the machining process for this purpose.

According to the invention, this object is achieved when at least one guide bush for supporting the boring bar in a workpiece bore is provided on the boring bar, the guide bush being associated in a coaxial arrangement with a clamping ring of a ring thickness which makes self-jamming tilting on the boring bar possible, and which clamping ring is pivotally coupled at one peripheral point to the guide bush to permit a small radial movement and has an external diameter smaller than that of the guide bush, and when at least one disengageable stopping device for a guide bush is provided within the coolant feed device. When such a guide bush with its clamping ring is placed on the boring bar at the front in the feed direction, it can be held within the coolant feed device, for example by a stopping device which simply retains this guide bush. When support in the workpiece is then required with increasing drilling depth, this stopping device is disengaged and, with continuing further machining, the guide bush is brought up to the workpiece by the boring bar. Subsequently, the outside of the guide bush comes into guiding contact and hence slight frictional contact with the workpiece, so that the guide bush is thus retained at this point and the boring bar moves on through the guide bush. As a result, however, the clamping ring is tilted on the boring bar and therefore drags the guide bush into the workpiece. The guide bush then always remains in position at this point of the boring bar and moves through the workpiece together with the boring bar, so that a boring bar length which can be predetermined is always supported.

In the case of a corresponding drilling depth, further guide bushes on the boring bar can also be moved into the workpiece in the same way.

At the end of the machining process, the boring bar carrying the guide bushes is then retracted in the opposite direction, so that the clamping ring of each guide bush is moved back again and made to bear against the end face of the guide bush. Its clamping action is thus cancelled. Depending on the frictional conditions of the guide bush on the workpiece surface or on the surface of the boring bar, the guide bush is dragged along with the retraction movement of the boring bar or it remains in the workpiece at the point reached. If the guide bush remains in position, it is later dragged back out of the workpiece by the tool arranged on the end of the boring bar, into the coolant feed device. The guide bush then comes to bear against the rear wall of the coolant feed device, or against another component suitable for this purpose, and cannot move further back. The stopping device already mentioned then comes again into engagement and ensures that, with a new forward movement of the boring bar for the purpose of further workpiece machining, the particular guide bush starts its travel into the workpiece only when an appropriate drilling depth, suitable for the purpose, has been reached. The disengagement of the stopping device like the engagement of the stopping device can here be effected fully automatically. Since the lenghts of boring bar which require support are known and the travel of the boring bar is controllable, the said stopping device can be actuated by appropriate electrical circuits, for example via a cam control, and be engaged or disengaged. Reliable support of the boring bar at the points correct for this purpose can thus be obtained with very simple means, if required, even fully automatically.

According to an embodiment of the invention, at least one spring is provided for initiating a tilting movement of the clamping ring. An inert behaviour of the clamping ring in the starting position can be prevented by this simple measure.

According to another embodiment of the invention, it is provided that the spring has the form of a helical compression spring and is located between the guide bush and the clamping ring. This makes particularly simple fabrication possible and moreover permits the use of standardized springs. At the same time, the arrangement described results in the best possible action of such springs.

Again according to an embodiment of the invention, it is provided that the spring is of such dimensions that, even if the ring thickness is not self-jamming, it exerts a clamping force which is sufficiently strong for taking the guide bush along, by tilting the clamping ring. This feature also provides all the advantages and, furthermore, has the result that, for example when the external diameter of the guide bush is too large for the bore in the workpiece, for example due to an error, the guide bush and the clamping ring simply slide through on the boring bar and the guide bush thus stops in front of the workpiece. A forced rupture of the guide bush and consequent damage to the boring bar are prevented. Damage to the workpiece is likewise prevented.

Another embodiment of the invention in turn provides that at least one stopping device is designed as a claw which is pivotable about an axis parallel to the axis of the boring bar. This type of design of the stopping device is space-saving and can be actuated in a simple manner.

An embodiment of the invention likewise provides that an independent pivoting device is provided for each claw. If several claws are present, this avoids a mutual dependence in the movement sequence of the claws and the overall structure remains clearer.

A further development embodiment of the invention also provides that each independent pivoting device is power-operated and controlled by the machine control. The result is that the device can be controlled either automatically or manually by simple means, as required.

In a further developed embodiment of the invention it is also proposed that one stopping device is provided for each guide bush. This makes it possible to treat each individual guide bush independently.

An embodiment of the invention provides in turn that devices for detecting the presence of guide bushes in an allocated starting position are provided. In this way, it can be positively checked whether a desired starting position for a subsequent machining has been reached, and the machine control can react to such a detection. In this way, it is then possible to ensure, for example, that the number of guide bushes in the coolant feed device is not too small, for example due to an assembly fault.

A developed embodiment of the invention provides that such a device for detecting its presence is provided for each guide bush. As a result of this, it is not necessary to make a check for the guide bushes altogether and, instead, the presence of each individual guide bush can be detected.

Another further developed embodiment of the invention provides that each device for detecting the presence of guide bushes consists of a two-armed lever which is subject to the bias of a spring and is mounted on a carrier arranged in the coolant feed device, one arm being operable by a guide bush and the other arm effecting a switching action as a result of a corresponding movement. These are very simple control devices which are robust, work reliably and are of simple construction.

Finally, in a further developed embodiment of the invention it is also proposed that the other arm of a two-armed lever interacts with a proximity initiator, the switch pulses of which are processed by the machine control. Proximity initiators are proven components, so that a reliable and inexpensive circuit structure can be obtained.

Figure 2:
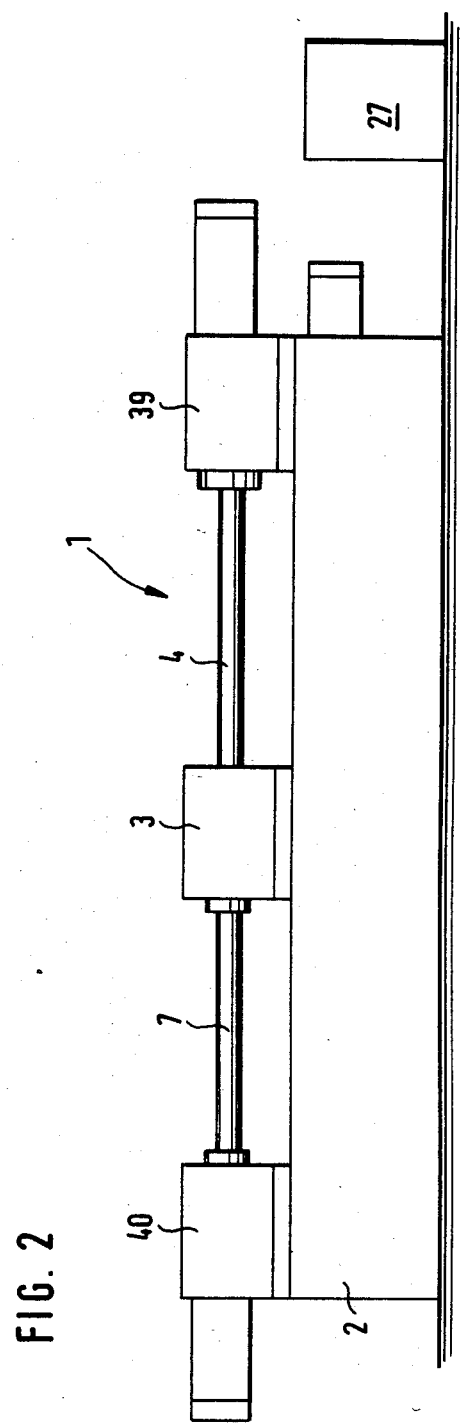
Figure 3:
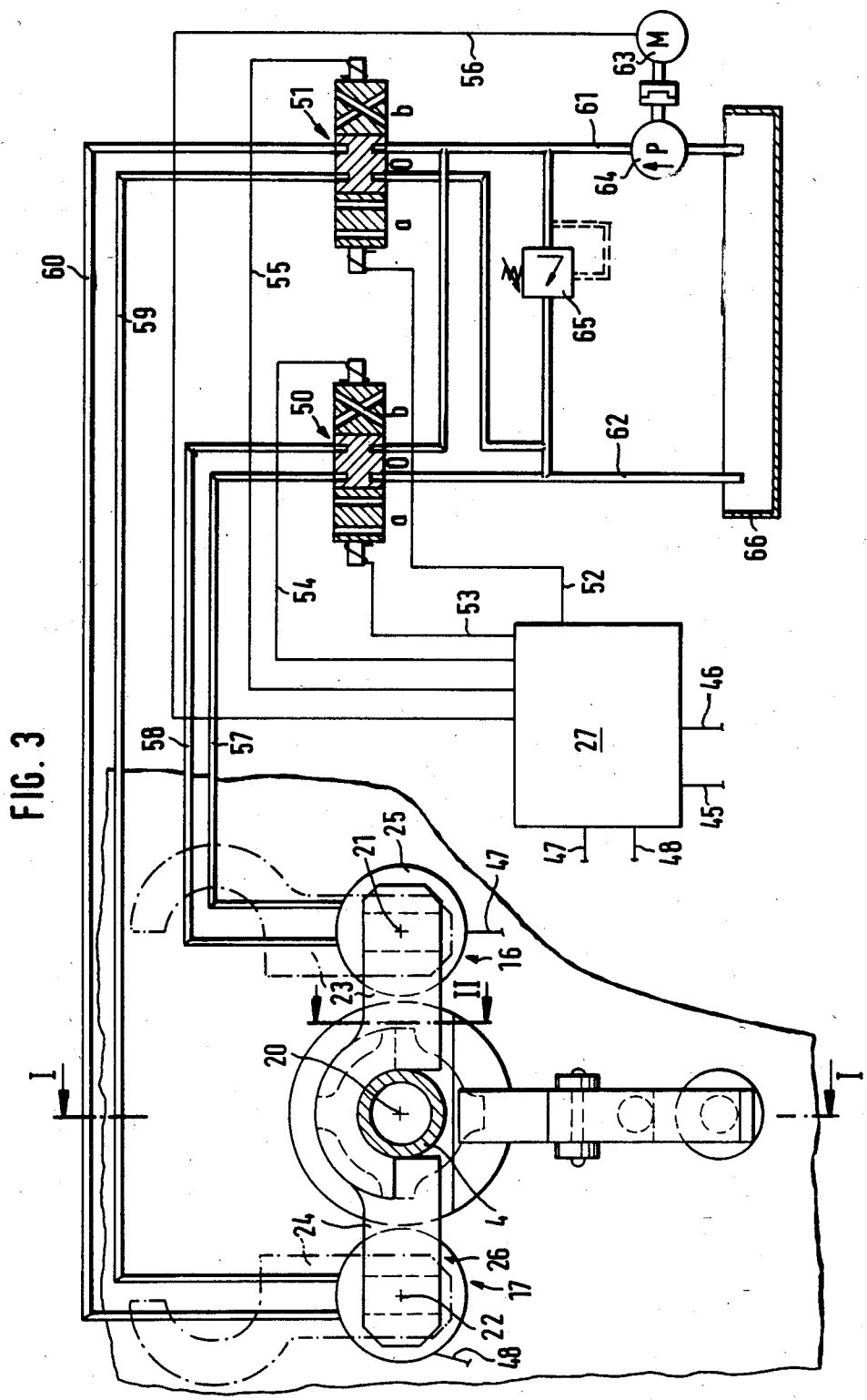
Figure 4:
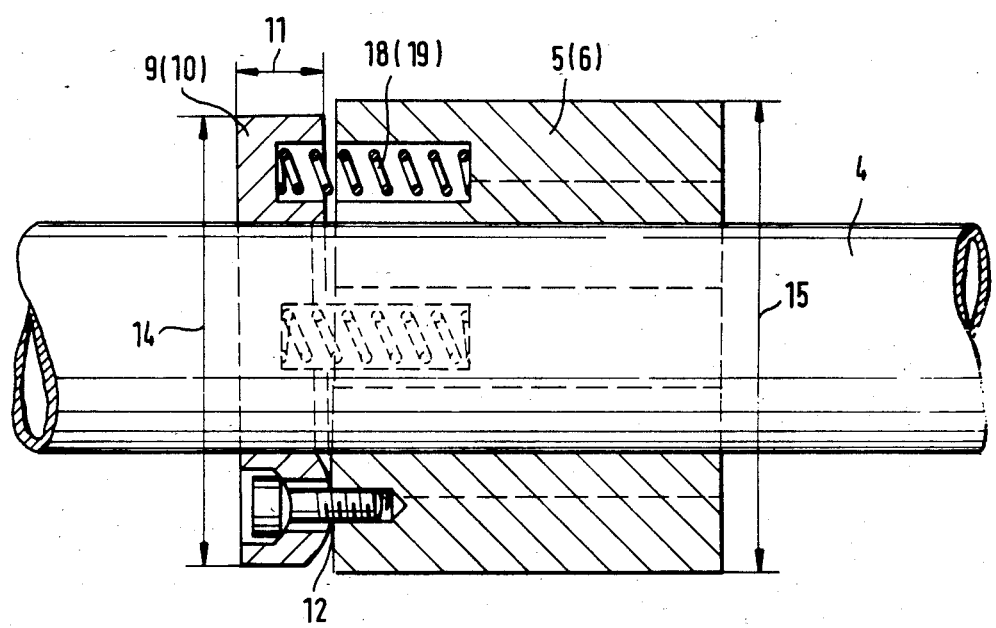
Figure 5:
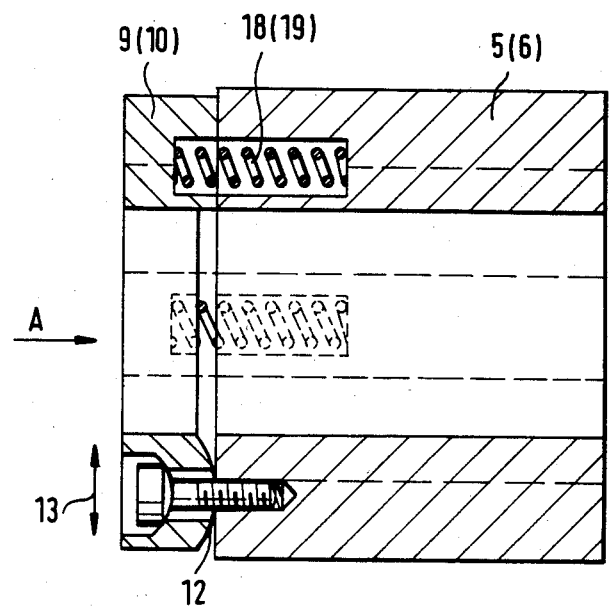
Figure 6:
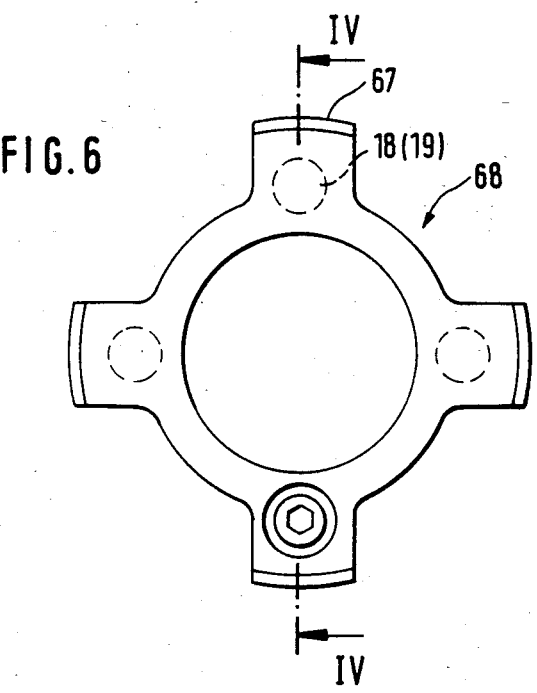

The invention will now be explained in more detail by reference to the attached drawings in which:

FIG. 1 shows a section I—I according to FIG. 3 through the coolant feed device, but with the claw (23) according to Section II in FIG. 3, and with the boring bar bushing not sectioned, FIG. 2 shows a side view of the deep-hole drilling machine, FIG. 3 shows a view in the direction III—III according to FIG. 1, with the boring bar in section and the hydraulic control, FIG. 4 shows a longitudinal section IV—IV according to FIG. 6 through a guide bush in the clamped position, FIG. 5 shows a longitudinal section IV—IV according to FIG. 6 through a guide bush, but in the starting position, and FIG. 6 shows a view in the direction of the arrow A according to FIG. 5.

FIG. 2 shows the usual construction of a deep-hole drilling machine 1 in which, for example on a machine foundation 2, a headstock 39 is arranged on the right-hand side, which headstock can carry the boring rod 4 and can be arranged displaceably on the foundation 2. In the known manner, the headstock 39 can here also have a rotary drive for the boring rod 4.

At the other end of the machine foundation 2, a likewise known tailstock 40 can be located, and a coolant feed device 3 can then be arranged between the two. A workpiece 7 can be arranged for machining, in a manner known per se, between the coolant device 3 and the tailstock 40. The entire machining process can then be controlled by the machine control 27.

In the illustrative embodiment according to FIG. 2, for example, the workpiece 7 is to be driven in rotation by the drive of the tailstock 40. That end of the boring bar 4 which is located in the coolant feed device carries a known machining tool and, as shown in FIG. 1, two guide bushes 5 and 6. The boring rod 4 has here been introduced into the coolant feed device 3 through a sealing bush 41. On the inside, in the coolant feed device, this sealing bush 41 has a collar 42 which in turn has a recess 43 in the lower region.

To the left and right, next to the sealing bush 41, stopping devices 16 and 17 (FIG. 3) are arranged in the interior of the coolant feed device 3. These stopping devices 16 and 17 essentially consist, in the illustrative embodiment, of pivoting devices 25 and 26 which can be actuated hydraulically and the pivoting axes 21 and 22 of which are arranged parallel to the axis 20 of the boring bar 4. One claw 23 or 24 is arranged, secure against rotation, on each of the pivoting axes 21 and 22 respectively. The pivoting devices 25 and 26 can each pivot these claws 23 and 24 respectively by at least 90° so that in one case the situation which is shown in FIG. 3 in full lines and in which the guide bushes 5 and 6 are stopped is reached and, in the other case, a position of the claws 23 and 24 can be reached, as corresponds to the illustration shown in dots and dashes.

The illustrations according to FIG. 1 and FIG. 3 show the starting position in which one guide bush 5 is in contact at the rear with the collar 42 of the sealing bush 41. In front of the clamping ring 9 of the guide bush 5, there is the claw 24 in the position pivoted in, so that the guide bush 5 cannot migrate with the boring bar, when the boring bar moves in the direction of the arrow 44, but is instead retained by the claw 24.

In front of the claw 24 and in contact with the latter, there is a further guide bush 6 on the boring bar 4. In front of the clamping ring 10 of this guide bush 6, there is, likewise in the position pivoted in, a claw 23 which prevents the guide bush 6 from being dragged along when the boring bar 4 moves in the direction of the arrow 44.

For checking the position and presence of the two guide bushes 5 and 6, a carrier 30 is located in the interior of the coolant feed device 3, on which carrier, two two-armed levers 28 and 29 are pivotably mounted. When the guide bushes 5 and 6 migrate into the starting position shown in FIG. 1, the guide bush 5 permanently actuates the arm 32, and the guide bush 6 actuates the arm 31, of the two-armed lever 29 and 28 respectively. As a result, the arms 33 and 34 are pivoted against the force of the springs 35 and 36 respectively. This pivoting movement is picked up by the proximity initiators 37 and 38 located in the housing of the coolant feed device 3 and is transmitted via the control lines 45 and 46 to the machine control 27. The rotary position of the claws 23 and 24 is also transmitted via control lines 47 and 48 to the machine control 27. The machine control 27 thus receives information to the effect that two guide bushes are present in the coolant feed device 3 and the entire device is in the starting position. With the aid of the centering device 49 of the coolant feed device 3 and the corresponding counterpart of the tailstock 40, a workpiece 7 can then be received in the machine and driven. Although the centering device 49 is indicated in FIG. 1 as being stationary (for example for the case of a rotary drive of the boring bar 4), it can readily be exchanged for a corresponding rotatable centering device. When the workpiece 7 has been properly chucked, machining can be started by moving the machining tool, not shown in more detail here, into the workpiece bore 8 with corresponding rotary movement of the workpiece 7 and/or the boring bar 4 and by machining the workpiece bore by a corresponding feeding movement of the boring bar 4 in the direction of the arrow 44.

When, during machining, the boring bar 4 has travelled a desired length in the direction of the arrow 44, the hydrualic valve 50 which is in the position 0 receives, from the machine control 27 via the control line 53, the command to move into position a. At a suitable point in time, the motor 64 has likewise received, from the machine control 27 via the control line 56, a command to start so that the motor 63 drives the hydraulic pump 64.

Due to the change-over of the hydraulic valve 50 into the switch position a, pressure medium then flows through the pipe 61 and 58 to the pivoting device 25 and thus pivots the claw 23 out into the dashed and dotted position according to FIG. 3. As a result, the clamping ring 10 is enabled to tilt under the action of the spring 19, so that the guide bush 6 can then be freely taken along by the boring bar 4. Within the coolant feed device 3, the guide bush would do this even without the aid of the clamping ring 10, because of the friction arising between the boring bar 4 and the guide bush.

Due to the movement of the guide bush 6 in the direction of the arrow 44, together with the boring bar 4, the arm 34 comes again into contact with the proximity initiator 38, so that as a result the machine control 27 receives a signal via the control line 46, to the effect that the guide bush 6 has moved off as intended.

When the guide bush 6 reaches the beginning of the workpiece bore 8 in the workpiece 7, friction also arises between the outside of the guide bush 6 and the workpiece 7, so that normally the guide bush 6 would stop in this position. Since, however, the clamping ring 10 has an external diameter 14 which is smaller than the external diameter 15 of the guide bush 6, the clamping ring can move freely in the workpiece bore 8 and is moved by the spring 19 in the direction of tilting. This is ensured by the pivotal linkage of the clamping ring 10 at the point 12, this pivotal linkage permitting at the same time a small radial movement 13 of the clamping ring 10. As a result, the clamping ring 10 can tilt on the boring bar 4. Since the clamping ring 10 has a ring thickness 11 which is so small that the clamping ring 10 is guided on the boring bar to be self-jamming, the guide bush 6 is securely joined to the boring bar 4 by the tilting described and the linkage at the point 12 and is further transported into the workpiece bore 8 due to the feed movement of the boring bar in the direction of the arrow 44 and thus supports the boring bar 4 in this position in the workpiece 7, as intended.

Increasing boring depth leads to a further free and possibly excessive length of the boring bar 4, which again requires support. Therefore, at an appropriate distance before this length to be supported is reached, the hydraulic valve 51 which is in the zero position is then caused by the machine control 27 via the control line 52 to move into the switch position a. As a result, pressure medium driven by the hydraulic pump 64 can pass via the pipe 61 and 60 to the pivoting device 26, whereby the latter is caused to pivot the claw 24 into the dotted and dashed position shown in FIG. 3. The return oil can here by passed via the pipe 59, as in the case of the pivoting device 25 via the pipe 57, and then via the common pipe 62 to the tank 66. The fact that the particular rotary position has been reached can then again be signalled to the machine control via the control lines 47 and 48 respectively.

After the claw 24 has been pivoted up, the guide bush 5 moves in the same way as already described for the guide bush 6. The difference is that, in the case of the guide bush 5, the spring 18 ensures the corresponding movement of the clamping ring 9. Likewise, with respect to the guide bush 5, the moving away of the latter in the manner intended is signalled by the pivoting-in of the arm 33 in the direction of the proximity initiator 37 via the control line 45 to the machine control 27.

In order to enable the necessary quantity of cooling oil to be transported to the tool, the guide surfaces 67 of the guide bushes 5 and 6 are separated from one another by generously designed free spaces 68. In this way, adequate transport of coolant can be ensured.

After the end of the machining process, the boring bar 4 is retracted in the direction inverse to the arrow 44. In this situation, sufficiently strong spring 18 and 19 can ensure that the clamping rings 9 and 10 remain clamped to the boring bar 4 with sufficient force so that they can also retract again the guide bushes 5 and 6 from the workpiece bore 8 at their original mutual distance. The guide bush 5 then first enters the coolant feed device 3 and, with appropriate actuation of the two-armed lever 29, comes to bear against the collar 42 of the sealing bush 41. This is signalled to the machine control 27 via the proximity initiator 37 and the control line 45. The machine control then causes a change-over of the hydraulic valve 51 via the control line 55 into the switch position b, whereby the claw 24, driven by the pivoting device 26, pivots back again into the original position and thus blocks the guide bush 5 in its position. When the control line 48 has signalled to the machine control 27 that this pivoting position has been reached, the machine control causes the hydraulic valve 51 to drop again into the zero position.

The further rearward movement of the boring bar 4 ensures that the clamping ring 9 tends to right itself against the force of the expanding spring 18, so that the clamped connection of the clamping ring 9 to the boring bar 4 is loosened and the boring bar can, relatively without hindrance, move further back and thus also transport the guide bush 6 into the coolant feed device 3, the guide bush 6 in turn then coming to bear against the claw 24. As a result, a corresponding signal is transmitted via the control line 46 to the machine control 27 via the two-armed lever 28 and the proximity initiator 38, the machine control in turn causing, via the control line 54, the hydraulic valve 50 to move into the switch position b. As a result, the claw 23 also pivots back into the original position, in the manner already described with respect to claw 24, and thus blocks the guide bush 6 in this starting position. The fact that this rotary position of the claw 23 has been reached is then again signalled by the control line 47 to the machine control 27 which thus causes the hydraulic valve 50 to drop into the zero position. The workpiece 7 can then be removed and exchanged for a new workpiece. The machining cycle can start anew.

Having thus described the invention and illustrated its use, what is claimed as new and is desired to be secured by Letters Patent in the United States is:

1. Deep-hole drilling machine, having a coolant feed device which is arranged on a machine foundation and through which a boring bar passes comprising at least one guide bush, a clamping ring having a bore encompassing said bar, said bore being sized to permit tilting and radial movement of said ring relative to the axis of said bar, the external diameter of said ring being less than the diameter of said bush, coupling means connecting said ring to said bush in substantial coaxial alignment, said coupling means pemitting limited radial and tilting movements of said ring relative to said bush, said ring being sized to clamp to said bar responsive to tilting of said ring relative to said bush, and at least one disengagable stopping means in said feed device shiftable between blocking and releasing positions of said clamping ring.

2. Deep-hole drilling machine according to claim 1, characterized in that at least one spring is provided for initiating a tilting movement of the clamping ring.

3. Deep-hole drilling machine according to claim 2, characterized in that the spring has the form of a helical compression spring and is located between the guide bush and the clamping ring.

4. Deep-hole drilling machine according to claim 1, characterized in that said at least one stopping means comprises a claw which is pivotable about an axis parallel to the axis of the boring bar.

5. Deep-hole drilling machine according to claim 4, characterized in that each said claw includes an independent pivoting device.

6. Deep-hole drilling machine according to claim 5 characterized in that each said independent pivoting device is power-operated and controlled by a machine control.

7. Deep-hole drilling machine according to claim 1, characterized in that one stopping means is provided for each guide bush.

8. Deep-hole drilling machine according to claim 1, characterized in that devices for detecting the presence of guide bushes in an allocated starting position are provided.

9. Deep-hole drilling machine according to claim 8, characterized in that one said device for detecting its presence is provided for each guide bush.

10. Deep-hole drilling machine according to claim 8, characterized in that each device for detecting the presence of guide bushes consists of a two-armed lever which is subject to the bias of a spring and is mounted on a carrier arranged in the coolant feed device, one arm being operable by a guide bush and the other arm effecting a switching action as a result of a corresponding movement.

11. Deep-hole drilling machine according to claim 10, characterized in that the other arm interacts with a proximity initiator, the switch pulses of which are processed by said machine control.

* * * * *